(12) United States Patent
Samie et al.

(10) Patent No.: US 11,476,733 B2
(45) Date of Patent: Oct. 18, 2022

(54) ELECTRIC MACHINE WITH FORCED CONVECTION-BASED ROTOR COOLING OF ROTOR MAGNETS

(71) Applicant: GM GLOBAL TECHNOLOGY OPERATIONS LLC, Detroit, MI (US)

(72) Inventors: Farzad Samie, Franklin, MI (US); Alireza Fatemi, Canton, MI (US); Derek F. Lahr, Howell, MI (US); Erik B. Golm, Warren, MI (US); Xiaofeng Yang, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 365 days.

(21) Appl. No.: 16/671,732

(22) Filed: Nov. 1, 2019

(65) Prior Publication Data

US 2021/0135533 A1 May 6, 2021

(51) Int. Cl.
*H02K 5/12* (2006.01)
*H02K 5/128* (2006.01)
*H02K 1/276* (2022.01)
*H02K 9/00* (2006.01)

(52) U.S. Cl.
CPC ............ *H02K 5/128* (2013.01); *H02K 1/276* (2013.01); *H02K 9/00* (2013.01)

(58) Field of Classification Search
CPC .. H02K 1/24; H02K 1/28; H02K 1/02; H02K 1/32; H02K 1/265; H02K 1/26; H02K 3/527; H02K 3/52; H02K 3/34; H02K 3/345; H02K 3/18; H02K 19/02; H02K 19/16; H02K 19/38; H02K 9/22; H02K 9/02; H02K 9/19; H02K 5/128; H02K 1/00; H02K 1/325

USPC ... 310/52–59, 261.1–266, 216.001, 216.074, 310/216.091, 216, 61, 262, 433, 216.132, 310/216.086, 216.079, 216.013, 216.004, 310/269, 417
See application file for complete search history.

(56) References Cited

U.S. PATENT DOCUMENTS

| | | | | |
|---|---|---|---|---|
| 3,189,769 A | * | 6/1965 | Willyoung | H02K 9/225 310/52 |
| 3,462,625 A | * | 8/1969 | Endress | H02K 1/32 310/61 |
| 3,521,094 A | * | 7/1970 | Widder | H02K 9/19 310/58 |
| 4,303,842 A | * | 12/1981 | Nathenson | H02K 3/22 310/201 |
| 4,315,172 A | * | 2/1982 | Intichar | H02K 9/20 310/64 |

(Continued)

*Primary Examiner* — Maged M Almawri
(74) *Attorney, Agent, or Firm* — Quinn IP Law

(57) ABSTRACT

A rotary electric machine for use with coolant includes a stator and rotor assembly. The rotor assembly includes a rotor, rotor shaft, and first and second end rings. The rotor has inner and outer diameter surfaces and an embedded set of rotor magnets proximate the outer diameter surface. The shaft is connected to the rotor and defines a main coolant passage along an axis of rotation. Radial shaft coolant passages are in fluid communication with the main coolant passage. The end rings are positioned at opposing distal ends of the rotor. The shaft coolant passages direct the coolant into the rotor and/or the end rings such that the coolant flows axially through rotor cavities of the rotor and cools the rotor magnets via forced convection.

20 Claims, 3 Drawing Sheets

(56) References Cited

U.S. PATENT DOCUMENTS

| | | | | |
|---|---|---|---|---|
| 4,467,229 | A * | 8/1984 | Ogita | H02K 9/12 310/157 |
| 5,189,325 | A * | 2/1993 | Jarczynski | H02K 9/19 310/61 |
| 5,424,593 | A * | 6/1995 | Vaghani | H02K 9/19 310/68 D |
| 6,232,691 | B1 * | 5/2001 | Anderson | H02K 5/1735 310/179 |
| 6,734,585 | B2 * | 5/2004 | Tornquist | H02K 1/325 310/58 |
| 7,489,057 | B2 * | 2/2009 | Zhou | H02K 9/19 310/61 |
| 8,004,140 | B2 * | 8/2011 | Alexander | H02K 1/2773 310/216.057 |
| 8,080,908 | B2 * | 12/2011 | Matsubara | H02K 1/2766 310/156.53 |
| 8,970,074 | B2 * | 3/2015 | Wagner | H02K 5/20 310/59 |
| 8,970,075 | B2 * | 3/2015 | Rippel | H02K 1/32 310/60 A |
| 10,135,319 | B2 * | 11/2018 | Hanumalagutti | H02K 9/19 |
| 10,326,334 | B2 * | 6/2019 | Larjola | H02K 7/083 |
| 10,630,134 | B2 * | 4/2020 | Goldstein | H02K 5/18 |
| 10,826,363 | B2 * | 11/2020 | Huang | H02K 1/24 |
| 2003/0030333 | A1 * | 2/2003 | Johnsen | H02K 1/32 310/54 |
| 2004/0080218 | A1 * | 4/2004 | Weidman | H02K 1/32 310/61 |
| 2004/0164627 | A1 * | 8/2004 | Tornquist | H02K 1/325 310/59 |
| 2006/0082228 | A1 * | 4/2006 | Urbahn | H02K 9/20 62/50.7 |
| 2010/0289356 | A1 * | 11/2010 | Kida | H02K 11/02 310/71 |
| 2013/0038151 | A1 * | 2/2013 | Ohashi | H02K 7/088 310/59 |
| 2013/0057117 | A1 * | 3/2013 | Suzuki | B60K 7/0007 310/60 R |
| 2013/0221772 | A1 * | 8/2013 | Miyamoto | H02K 1/32 310/54 |
| 2013/0313938 | A1 * | 11/2013 | Yamada | H02K 16/02 310/156.69 |
| 2014/0042841 | A1 * | 2/2014 | Rippel | H02K 9/19 310/54 |
| 2014/0333163 | A1 * | 11/2014 | Horii | H02K 5/20 310/59 |
| 2015/0288255 | A1 * | 10/2015 | Barker | H02K 1/32 310/43 |
| 2016/0036276 | A1 * | 2/2016 | Yamagishi | H02K 1/32 310/59 |
| 2016/0301268 | A1 * | 10/2016 | Watanabe | H02K 9/19 |
| 2018/0198331 | A1 * | 7/2018 | Sano | H02K 1/2766 |
| 2019/0068012 | A1 * | 2/2019 | Yazaki | H02K 1/28 |
| 2019/0207447 | A1 * | 7/2019 | Swales | H02K 1/2766 |
| 2019/0267859 | A1 * | 8/2019 | Kitahara | H02K 1/32 |
| 2020/0036249 | A1 * | 1/2020 | Krais | H02K 9/19 |
| 2020/0136451 | A1 * | 4/2020 | Zeichfüssl | F03D 9/25 |
| 2020/0186007 | A1 * | 6/2020 | Kitao | H02K 1/32 |
| 2020/0282822 | A1 * | 9/2020 | Oh | H02K 7/088 |
| 2020/0366158 | A1 * | 11/2020 | Morishita | H02K 5/15 |
| 2021/0111614 | A1 * | 4/2021 | Fratila | H02K 21/14 |
| 2021/0119508 | A1 * | 4/2021 | Remboski | H02K 5/12 |

* cited by examiner

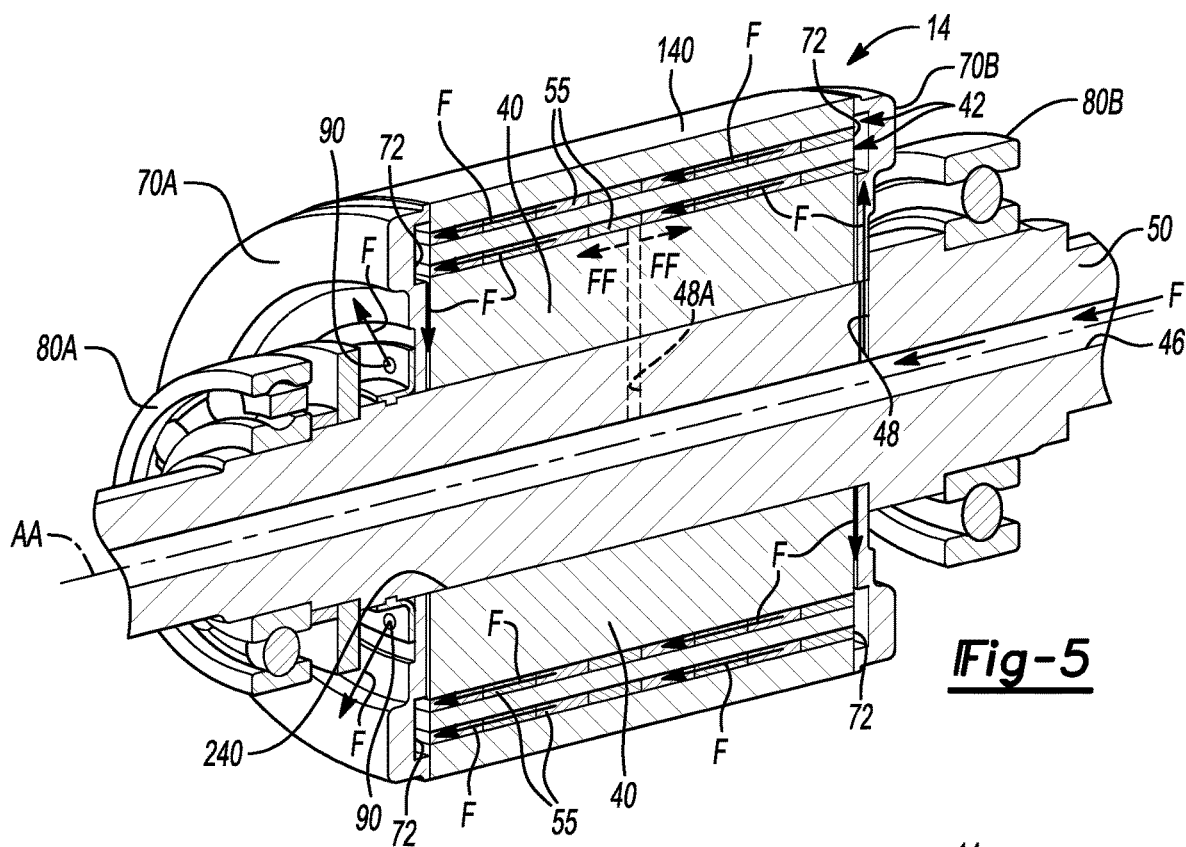
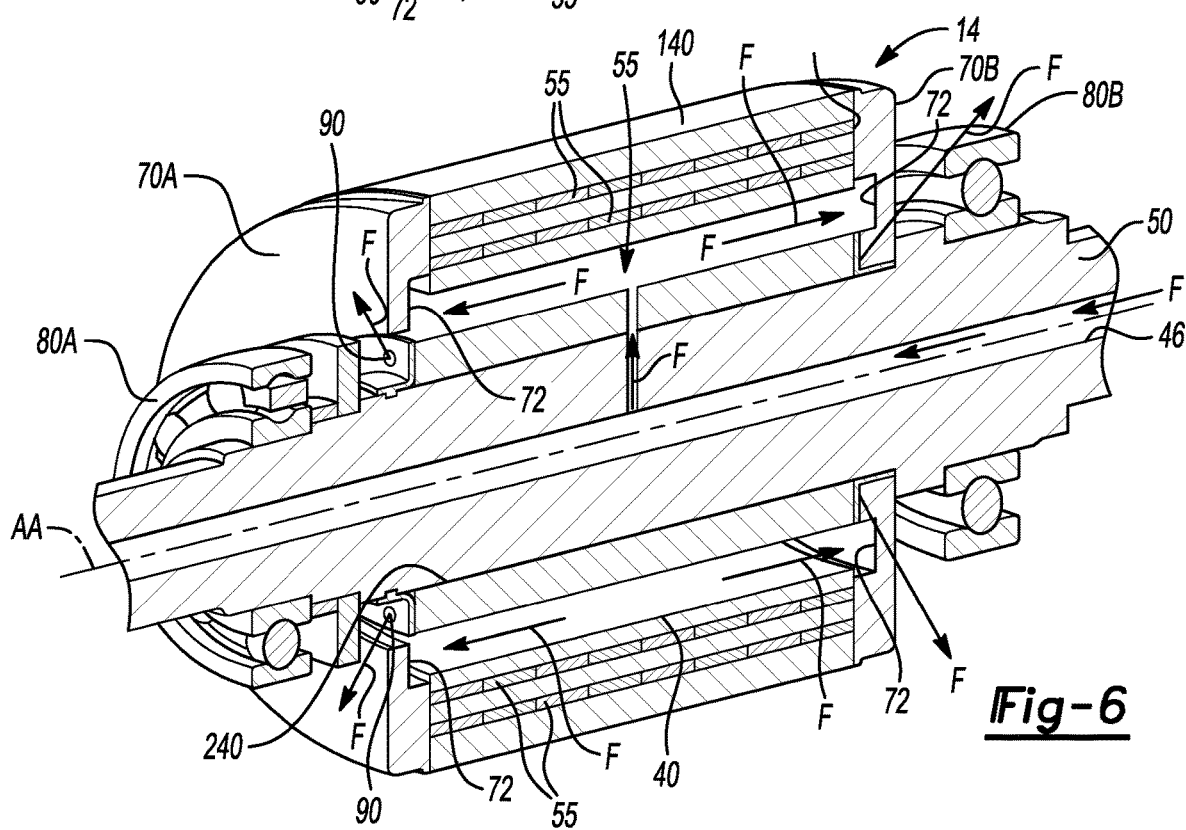

ELECTRIC MACHINE WITH FORCED CONVECTION-BASED ROTOR COOLING OF ROTOR MAGNETS

INTRODUCTION

Electric traction motors and motor generator units are commonly referred to as rotary electric machines. Such machines have a rotor and a stator spaced a short distance apart from each other by an airgap. Multiple stator teeth project radially from a cylindrical stator core toward the rotor, with adjacent stator teeth being separated from one other by a respective stator slot. Each stator slot is filled with conductive wires or solid bar segments that collectively form a set of stator windings. In a polyphase rotary electric machine, an alternating current ("AC") input voltage is applied to the stator windings to energize the stator and thereby generate a rotating stator magnetic field.

The rotor of an interior permanent magnet ("IPM")-type machine includes an embedded set of permanent magnets. Unlike the electromagnets resulting from sequential energization of the above-noted stator windings, the rotor magnets establish a time-invariant rotor magnetic field. The stator and rotor magnetic fields interact to produce and sustain forces within the stator-rotor airgap, with such forces ultimately imparting rotation to the rotor and a connected rotor shaft.

The torque performance of a rotary electric machine is affected by operating temperature. Therefore, a thermal management system is typically used to regulate machine temperature in real-time. The torque performance of an IPM traction motor in particular is highly dependent on the temperature of the rotor magnets embedded within steel lamination layers of the rotor. For instance, the problem of iron losses occurs under high power modes of operation, with such iron losses ultimately increasing with and contributing to rotor temperature. Materials-based approaches for mitigating some of the problems commonly associated with elevated rotor temperature, e.g., the use of specialized temperature-resistant rotor magnets, may be suboptimal in certain applications due to added cost and/or complexity. A need therefore exists for more efficient alternative approaches for reducing rotor/rotor magnet temperature within a rotary electric machine.

SUMMARY

The present disclosure relates to forced convection-based methods and related structure for cooling a rotor of a rotary electric machine. The solutions described herein may be employed within a rotor assembly having a set of interior permanent rotor magnets, which may be embedded within lamination layers of a cylindrical rotor. The rotor may be constructed of steel or another application-suitable ferrous material and enclosed between annular end rings, such that the end rings are disposed at opposing distal ends of the rotor.

The disclosed approach circulates an application-suitable coolant, e.g., automatic transmission fluid ("ATF"), through a network of interconnected cooling channels and cavities of the rotor assembly. The coolant is ultimately directed axially through the rotor. Desirable levels of convective cooling may occur in different disclosed embodiments either by direct/wetted cooling of the individual rotor magnets or by passing the coolant through rotor cavities. Such cavities are defined in pre-identified areas of the rotor having a low magnetic flux density relative to other areas of the rotor. Such low flux density areas are otherwise largely ineffective contributors to the electric machine's overall torque performance. The present approach enables the underutilized low flux density areas to be used to greater advantage in the cooling of the rotor magnets and the surrounding rotor with minimal degradation of the torque performance of the electric machine.

In an exemplary embodiment, the rotary electric machine includes a cylindrical stator and a rotor assembly, with the rotor spaced apart from the stator by an airgap. The rotor assembly includes a cylindrical rotor having an axis of rotation and inner and outer diameter surfaces. As noted above, the rotor defines a plurality of cavities. Permanent rotor magnets are embedded within the rotor in proximity to the outer diameter surface.

The rotor assembly also includes a rotor shaft that is connected to the rotor. The rotor shaft defines an elongated main coolant passage along the axis of rotation. The main coolant passage, which is configured to receive the coolant, also defines multiple radial shaft coolant passages. Each of the radial shaft coolant passages of the rotor shaft is in fluid communication with the main coolant passage and each of the cavities of the rotor.

The rotor assembly additionally includes first and second end rings respectively positioned at opposing distal ends of the rotor. The end rings define a respective annular pocket in fluid communication with the main coolant passage and the cavities of the rotor. The rotor shaft, rotor, and end rings are collectively configured, via the main coolant passage, the radial shaft coolant passages, the cavities, and the annular pockets, to conduct the coolant radially and axially through the rotor to thereby cool the rotor magnets via forced convection.

The cavities of the rotor in some embodiments extend from the inner diameter surface of the rotor toward the embedded rotor magnets, with the cavities residing within the low flux density regions. The rotor magnets may be disposed within a respective one of the cavities in some embodiments, in which case the cavities are referred to herein as "magnet cavities" for added clarity. Alternatively, the cavities may be positioned between the rotor shaft and the rotor magnets, in which case the cavities are referred to as "rotor cavities" to distinguish from the above-noted magnet cavities.

The rotor cavities may optionally include a main branch and at least one secondary branch intersecting the main branch. This branched embodiment may facilitate distribution of the coolant in the low flux density areas of the rotor.

The first and/or second end rings define drain holes in fluid communication with the cavities of the rotor, i.e., the magnet cavities or the rotor cavities depending on the embodiment. The drain holes may be evenly spaced with respect to each other and positioned adjacent to the inner diameter surface of the rotor, with the drain holes configured to deposit the coolant onto the stator when the coolant exits the rotor.

The rotor magnets in some configurations may be arranged in a generally V-shaped configuration when the rotor is viewed along the axis of rotation.

In different embodiments, the radial shaft coolant passages may be located at an axial midpoint of the rotor or proximate the first and/or second end rings.

The stator may circumscribe the rotor such that the airgap is a radial airgap. The electric machine in such an embodiment may be configured as a radial flux-type traction motor.

An electric propulsion system is also disclosed herein. The electric propulsion system includes a direct current ("DC") voltage bus and a traction power inverter module ("TPIM"). The TPIM is connected to and configured to receive a DC input voltage from the DC voltage bus, as well as to output an alternating current ("AC") voltage. The electric propulsion system includes a polyphase rotary electric machine for use with a coolant and energized via the AC voltage from the TPIM. The electric machine in this example embodiment is configured as set forth above.

Also disclosed herein is a method for cooling a rotary electric machine using ATF or another suitable coolant. The rotary electric machine that is cooled via the disclosed method includes a rotor positioned between the first and second end rings, with the rotor defining a plurality of cavities. The method according to an embodiment includes circulating the coolant via a pump through a main coolant passage defined by a rotor shaft of the electric machine. The main coolant passage extends along an axis of rotation of the rotor shaft, which in turn is connected to the rotor.

The method may include directing the coolant from the main coolant passages, through radial shaft coolant passages defined by the rotor shaft, and into a respective one of the cavities of the rotor either directly or through the first or second end rings. The coolant is then discharged from the rotor through drain holes defined by the first and/or second end rings.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIGS. 5 and 6 are cross-sectional side view illustrations of possible embodiments for forced convection-based cooling of rotor magnets within the electric machine depicted in FIG. 1.

Figure 1:
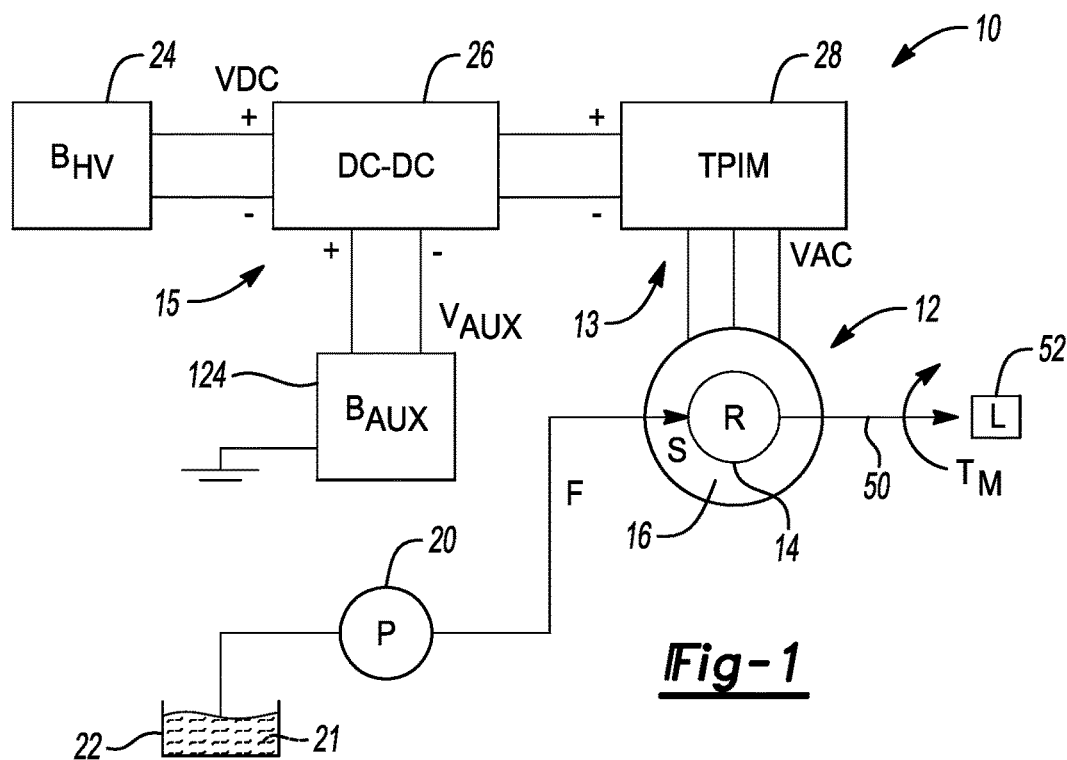
FIG. 1 is a schematic illustration of a mobile platform having a rotary electric machine whose rotor is internally cooled via forced convection using defined cavities as set forth herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 2:
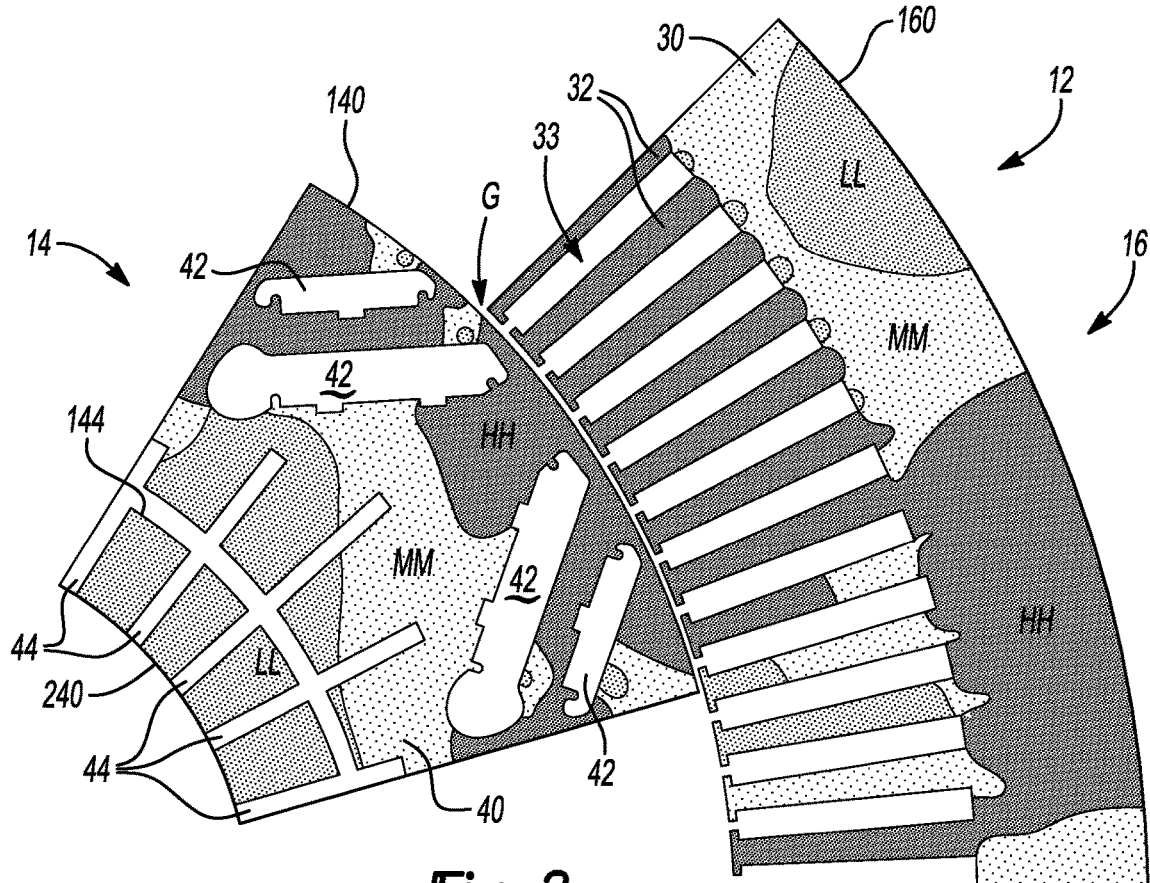
FIG. 2 is a schematic illustration of a representative cross-sectional area of the electric machine shown in FIG. 1 depicting different flux density regions and cooling channels used to for cooling the rotor.

Referring to the drawings, wherein like reference numbers refer to the same or like components in the several Figures, an electric propulsion system 10 is depicted schematically in FIG. 1. The electric propulsion system 10 includes a rotary electric machine 12 having a rotor assembly 14 and a stator 16, which are also respectively labeled "R" and "S" for added clarity. The rotor assembly 14 is positioned adjacent to the stator 16 and separated therefrom by an airgap G, as best shown in FIG. 2. The rotor assembly 14 in a non-limiting exemplary embodiment is arranged concentrically within the stator 16, i.e., the stator 16 circumscribes the rotor assembly 14, such that the airgap G of FIG. 2 is a radial airgap, and such that the electric machine 12 embodies a radial flux-type machine. However, other embodiments may be realized in which the relative positions of the rotor assembly 14 and the stator 16 are reversed, i.e., the rotor assembly 14 may surround the stator 16. For illustrative consistency, the embodiment of FIG. 1 in which the rotor assembly 14 resides radially within the stator 16 will be described hereinafter without limiting the construction to such a configuration.

The rotor assembly 14 of the present disclosure has an embedded set of permanent magnets referred to herein as rotor magnets 55 and shown in FIGS. 3-6. The electric machine 10 of FIG. 1 thus embodies an interior permanent magnet ("IPM")-type machine. When used in motor vehicle, powertrain, hoisting, or other beneficial applications, the electric machine 10 may be an electric traction motor. The rotor magnets 55 may be constructed, for example, of ferrite, neodymium iron boron, samarium cobalt, aluminum-nickel-cobalt, etc., or another application-suitable material. The rotor magnets 55 in such an IPM embodiment of the electric machine 10 are embedded within individual steel lamination layers of a rotor 40 (see FIG. 2).

As set forth herein, the rotor magnets 55 and surrounding or proximate regions of the rotor 40 of FIG. 2 are cooled via forced convection using an application-suitable coolant 21 as shown schematically in FIG. 1, e.g., automatic transmission fluid ("ATF"). The coolant 21 may be stored in a sump 22 and circulated via a coolant pump ("P") 20 through the rotor assembly 14 as described below with reference to FIGS. 2-6.

With continued reference to FIG. 1, the electric propulsion system 10 may include an alternating current ("AC") voltage bus 13. The AC voltage bus 13 may be selectively energized via a traction power inverter module ("TPIM") 28 using a high-voltage battery pack ("$B_{HV}$") 24, for instance a lithium ion, lithium sulfur, nickel metal hydride, or other high-energy voltage supply. The AC voltage bus 13 conducts an AC bus voltage ("VAC") to or from the electric machine 10. Machine output torque (arrow $T_M$) from the energized electric machine 10, when operating in a drive or motoring mode, is imparted to a connected rotor shaft 50 and directed to a coupled load ("L") 52, such as one or more road wheels of a motor vehicle (not shown), a propeller shaft, a drive belt, or other driven load depending on the application.

The electric propulsion system 10 may also include a direct current-to-direct current ("DC-DC") converter 26 configured to reduce or increase a relatively high DC bus voltage ("VDC") as needed. The DC-DC converter 26 is connected between the battery pack 24 and the TPIM 28 via positive (+) and negative (−) rails of a corresponding DC voltage bus 15. In some configurations, an auxiliary battery pack ("$B_{AUX}$") 124 may be connected to the DC-DC converter 26, with the auxiliary battery pack 124 possibly being embodied as a lead-acid battery or a battery constructed of another application-suitable chemistry and configured to store or supply a 12-15V auxiliary voltage ("$V_{AUX}$") to one or more connected auxiliary devices (not shown).

Referring to FIG. 2, the present solution envisions the use of forced convection-based cooling of the rotor 40 through cavities defined by the rotor 40 of the electric machine 12. Such cavities may be embodied as magnet cavities 42 or rotor cavities 44 and 144 as set forth below. The stator 16, which is cylindrical to circumscribe the likewise cylindrical rotor 40 of the rotor assembly 14 in the depicted exemplary embodiment, is separated from the rotor 40 by the above-noted airgap G. In such a configuration, the stator 16 and rotor 40 may each be constructed from a stack-up of thin lamination layers of electrical steel or another ferrous material, e.g., with each layer being about 2-5 mm thick as will be appreciated by those of ordinary skill in the art. The stator 16 has radially-projecting stator teeth 32 each extending inward from a cylindrical stator housing or core 30, with the stator core 30 having an outer diameter surface 160. That is, the stator teeth 32 extend from the stator core 30 toward an outer diameter surface 140 of the rotor 40. Adjacent stator teeth 32 of the stator 16 are separated from each other by a corresponding stator slot 33, as will be appreciated by those of ordinary skill in the art.

When constructing the electric machine 12 shown in FIG. 2, the stator slots 33 are substantially filled with an electrical conductor, typically copper wires or copper bars/"hairpins". Such conductors collectively form stator windings 35 (see FIG. 4). A rotating stator magnetic field is generated when the stator windings 35 are sequentially-energized by an AC output voltage from the TPIM 28 of FIG. 1. Stator magnetic poles formed from the resulting rotating stator field interact with rotor poles provided by the various rotor magnets 55 (see FIGS. 3-6) to rotate the rotor shaft 50 of FIGS. 1 and 3-6 and thereby power the load 52 of FIG. 1.

Figure 3:
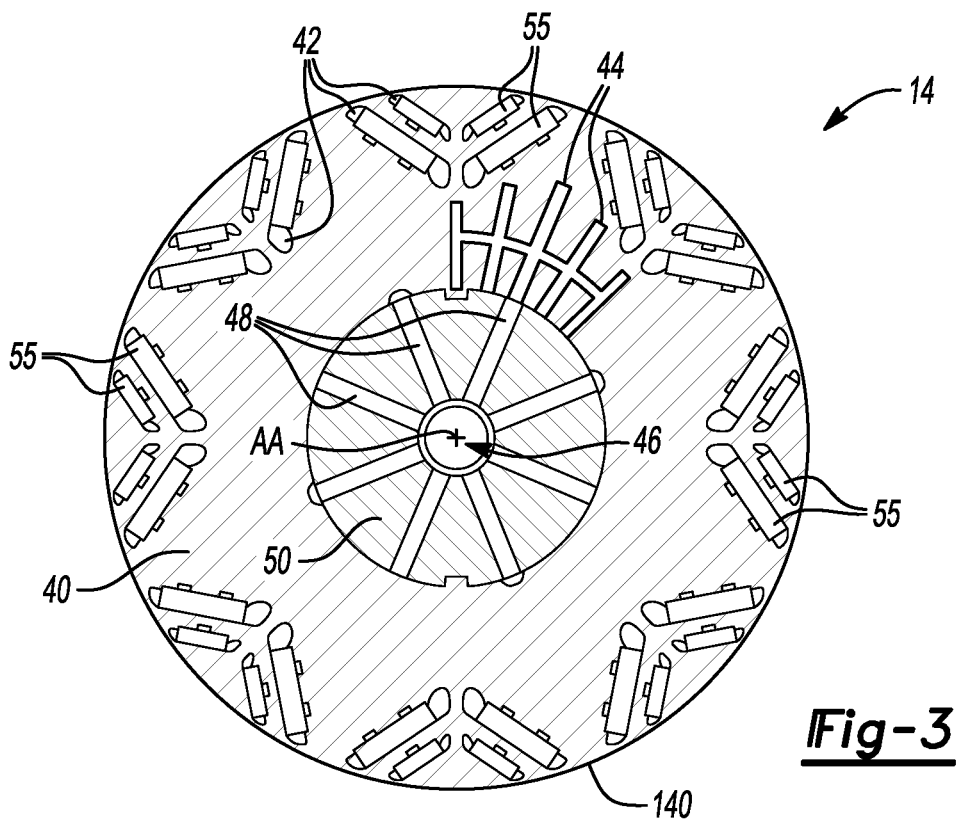
FIG. 3 is a schematic cross-sectional illustration of an exemplary rotor usable as part of the electric machine of FIGS. 1 and 2.

The number, type, position, and/or relative orientation of the rotor magnets 55 ultimately influences the magnitude and distribution of magnetic flux in the ferrous materials of the electric machine 12. The rotor magnets 55 may be arranged as shown in a generally V-shaped configuration, i.e., when the rotor 40 is viewed along its axis of rotation AA as shown in FIG. 3, in which ends of the rotor magnets 55 that are adjacent to the outer diameter surface 140 of the rotor 40 are spaced farther apart from each other than are the opposing ends of the rotor magnets 55 located adjacent to an inner diameter surface 240. As the rotor 40 is annular or ring-shaped, the inner diameter surface 240 is present opposite the outer diameter surface 140 adjacent to a rotor shaft 50 as shown in FIG. 3.

The present forced convection-based cooling approach includes initially identifying area of different magnetic flux density within the electric machine 12. Some areas will be relatively weak and thus underutilized in the torque generation process, i.e., low flux density regions LL. Medium and high flux density regions are likewise respectively labeled MM and HH. As different configurations and intended end uses of the electric machine 12 will have unique flux density distributions, the terms "high", "medium", and "low" are used herein solely in a relative sense.

Once the low flux density regions LL have been pre-identified offline, such as via modeling or testing of the rotor 40 with its embedded rotor magnets 55, an embodiment of the present teachings defines multiple rotor cavities 44 and 144 in the rotor 40. A simplified linear embodiment of the rotor cavities 44 and 144 is depicted in FIG. 2 for illustrative clarity. Such rotor cavities 44 are provided primarily in the low flux density regions LL of the rotor 40, with a given set of the rotor cavities 44 laterally joined via rotor cavity 144 as shown for improved flow of the coolant 21 (see FIG. 1). The rotor cavities 44 extend in a generally radial direction, i.e., outward from the rotor shaft 50 (see FIG. 3) and toward but not reaching the magnet cavities 42 and the rotor magnets 55 positioned therein. Although the rotor cavities 44 may also extend partially into the medium flux density regions MM, as such regions are arbitrarily defined in relative terms for a given electric machine 12, ideally the rotor cavities 44 are limited to the low flux density regions LL the extent possible to minimize degradation of torque performance.

In another embodiment, the coolant 21 of FIG. 1 is circulated through the magnet cavities 42 in direct/wetted contact with and cooling of the rotor magnets 55. In an assembled IPM configuration of the electric machine 12, each respective one of the rotor magnets 55 is positioned within a respective magnet cavity 42. In such an embodiment, the rotor magnets 55 are directly wetted and thereby cooled by the coolant 21 as the coolant 21 flows axially through the rotor 40. Both embodiments will now be described in further detail with reference to the remaining Figures.

Referring to FIG. 3, the rotor assembly 14 shown schematically in FIG. 1 includes the rotor 40, the rotor shaft 50, and the rotor magnets 55. The rotor shaft 50, which may be journaled or splined to the rotor 40 to rotate in conjunction therewith about an axis of rotation AA of the rotor assembly 14, defines a main coolant passage 46. The main coolant channel 46 extends along and is thus coaxial with the axis of rotation AA. Supply of the coolant 21 to the rotor 40 thus occurs initially through the main coolant passage 46, from which the coolant 21 is fed radially-outward through radial shaft coolant passages 48 defined by the rotor shaft 50, e.g., through eight equally-spaced radial shaft coolant passages 48 in a non-limiting embodiment.

Depending on the configuration, the coolant 21 of FIG. 1 may enter the rotor cavities 44 to indirectly cool a particular set of the rotor magnets 55, i.e., by lowering the temperature of the rotor 40 in areas close to the rotor magnets 55. Alternatively, the coolant 21 may directly enter the magnet cavities 42. For illustrative simplicity and clarity, a single set of rotor cavities 44 is depicted in FIG. 3 extending to toward and between adjacent sets of rotor magnets 44. However, in an actual construction of the rotor assembly 14 multiple similar sets of rotor cavities 44 would be equally-spaced around the circumference of the rotor shaft 50 and extending into the low flux density areas LL of the rotor 40 depicted in FIG. 2. In this manner, the coolant 21 is conducted toward each of the magnet cavities 42.

Figure 4:
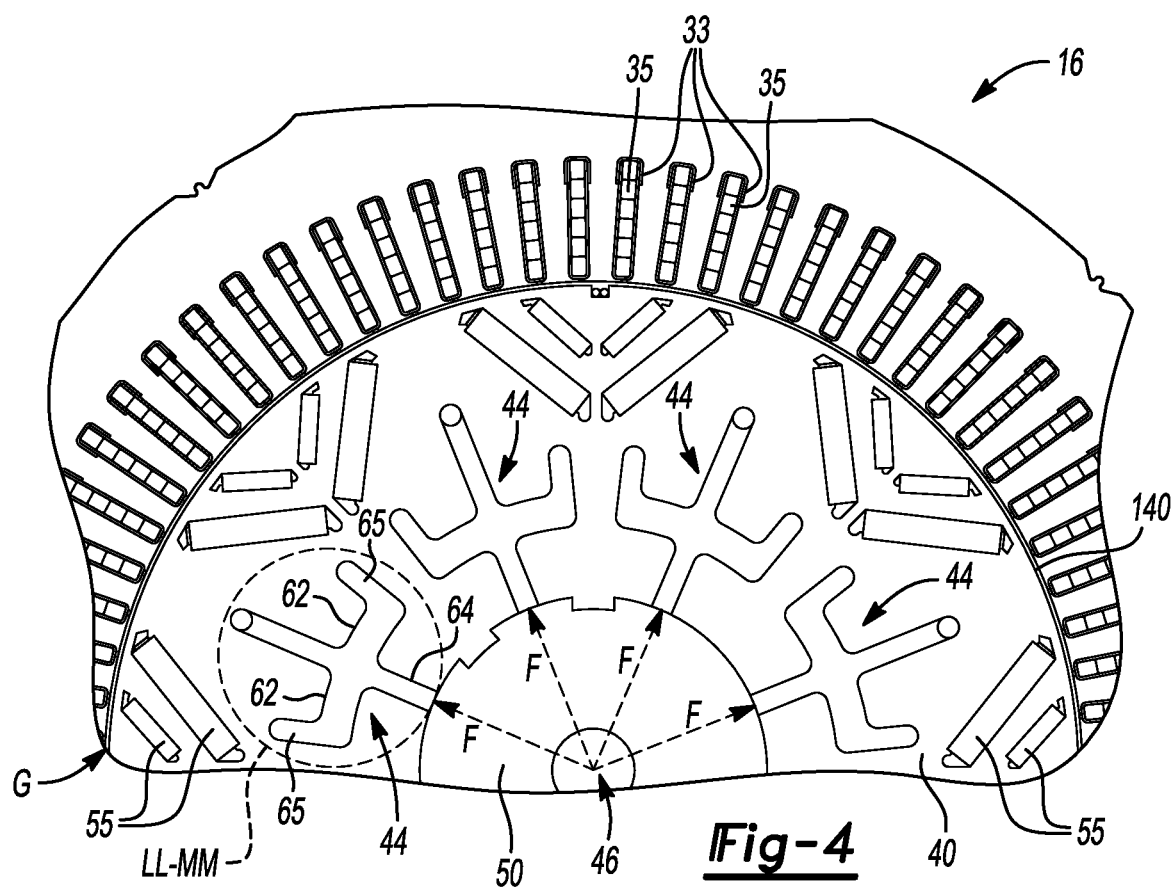
FIG. 4 is a schematic illustration of a representative portion of the electric machine shown in FIG. 1 depicting an alternative embodiment of the rotor's cooling channels.

The exemplary embodiment of FIG. 4 depicts a possible configuration of the rotor 40 in which the rotor cavities 44 are configured with a multi-branched/T-shape. For reference, a portion of the stator 16 is also shown that depicts the stator windings 35 filling the stator slots 33 in proximity to the rotor magnets 55. The rotor magnets 55 are arranged near the outer diameter surface 140 of the rotor 40 proximate the stator windings 35 to help ensure a strong mutual field interaction between the magnetic fields of the rotor 40 and the stator 16.

In FIG. 4, which is a schematic illustration of an internal layer of the rotor 40 and stator 16, with cross-hatching omitted for clarity, the rotor cavities 44 are depicted as providing a branched/generally T-shaped fluid distribution pattern. Each of the rotor cavities 44 in the illustrated embodiment includes a main branch 64 extending radially outward from the rotor shaft 50 in fluid communication with the main coolant passage 46. Coolant flow (arrow F) passes from the main coolant passage 46, through the radial shaft coolant passages 48 (see FIG. 3) within the rotor shaft 50, and into the respective main branch 64 of each of the rotor coolant passages 44. Instead of using multiple linear rotor cavities 44 as depicted in the simplified embodiment of FIG. 3, the branched embodiment of FIG. 4 intersects the rotor cavities 44 with a secondary branch 62 terminating in branch ends 65.

Such branch ends 65 may be parallel to the main branch 64 or angled slightly as shown to provide a desired distribution of the coolant 21. The branched configuration of FIG. 4 may use additional secondary branches 62 to further distribute the coolant 21 through the low flux density regions LL (see FIG. 2), and possibly a short distance into the medium flux density regions MM ("LL-MM") also shown FIG. 2, and therefore the embodiment of FIG. 4 is non-limiting and exemplary of the present teachings. That is, the rotor cavities 44 may, within the scope of the present disclosure, have other shapes, sizes, and contours as needed to provide the desired distribution of the coolant 21 within the rotor 40.

Referring to FIGS. 5 and 6, both of which omit the stator 16 of the electric machine 12 for illustrative simplicity, the rotor assembly 14 includes first and second end rings 70A and 70B that enclose the rotor 40 therebetween. In other words, the end rings 70A and 70B are disposed at opposing distal ends of the rotor 40, such that the rotor magnets 55 extend axially between the end rings 70A and 70B. The rotor shaft 50, which is circumscribed by the rotor 40 and the end rings 70A and 70B, is rotatably supported at its distal ends by bearing assemblies 80A and 80B. The size, shape, and construction of the bearing assemblies 80A and 80B, which is merely representative, is not relevant to the disclosed convective cooling function of the rotor assembly 14 and is therefore depicted solely for reference.

Delivery of the coolant 21 of FIG. 1 into the rotor assembly 14 via forced convection relies on the existence of a suitable cooling manifold. Within the scope of the disclosure, such a manifold includes the rotor shaft 50 and end rings 70A and 70B. That is, the coolant 21 may be circulated in some configurations through the rotor shaft 50, into one of the end rings 70A or 70B, through the rotor cavities 44 or the magnet cavities 42, and out through the other end ring 70B or 70A. Alternatively, the coolant 21 may be circulated through the rotor shaft 50, into the rotor cavities 44 or the magnet cavities 42, and out of the end rings 70A and/or 70B. Both options are depicted in FIGS. 5 and 6.

More specifically, coolant flow (arrow F) of the above-noted coolant 21 is delivered axially into the rotor 40 via the main coolant passage 46 defined by the rotor shaft 50. In the exemplary embodiment of FIG. 5, which may be used to directly cool the rotor magnets 55, the coolant flow (arrow F) may enter the main coolant passage 46 along the axis of rotation AA, e.g., from the right from the perspective of FIG. 5. The coolant 21 then enters the radial shaft coolant passages 48 located proximate the end ring 70B, one such passage 48 being visible from the cross-sectional perspective of FIG. 5, and then enters an annular/circular pocket 72 defined by the second end ring 70B near the outer diameter surface 140 of rotor 40. Also shown is an alternative embodiment in which a coolant passage 48A is located at the axial midpoint of the rotor 40, with the coolant passage 48A extending between and terminating in the main coolant passage 46 and the magnet cavities 42. Such a position may facilitate more evenly-distributed cooling of the rotor 40, e.g., by minimizing the distance the coolant 21 must travel in an axial direction through the rotor 40.

To ensure pooling and even distribution of coolant 21 to the magnet cavities 42, pockets 72 are defined by the end rings 70A and 70B of FIG. 5 immediately adjacent to the rotor magnets 55, i.e., at the distal ends of the rotor 40. Once the coolant 21 substantially fills the pocket 72 of end ring 70B in the illustrated embodiment, for instance, the coolant 21 enters the magnet cavities 42 (see FIG. 3) and thereafter flows axially through the rotor 40 through each of the fluidly-connected magnet cavities 42. The coolant 21 eventually enters the pocket 72 of the end ring 70A before exiting the rotor assembly 14.

While the rotor magnets 55 in a fully constructed embodiment of the rotor assembly 14 will occupy most of the available space within the magnet cavities 42, some space will remain around the periphery of the rotor magnets 55. The remaining space, which is best shown at the ends of the rotor magnets 55 depicted in FIG. 3, enables the coolant 21 to flow freely through the connected magnet cavities 42, i.e., from the second end ring 70B toward the first end ring 70A in the non-limiting example embodiment of FIG. 5 or vice versa. The coolant 21 thus flows axially through the rotor 40 in wetted contact with the rotor magnets 55, which extracts heat therefrom via forced convection.

To facilitate draining of the rotor 40 and subsequent distribution of the coolant 21, the first end ring 70A, which is located distally opposite the second end ring 70B, may be perforated to define a set of drain holes 90. Each drain hole 90 is sized, shaped, and spaced to enable the coolant 21 to freely exit the spinning rotor 40. The second end ring 70B may be similarly perforated in some embodiments. The drain holes 90 of FIGS. 5 and 6 are configured to evenly distribute the coolant 21 as the coolant 21 exits the distal end(s) of the rotor 40, e.g., by spraying or casting the discharged coolant 21 onto proximate stator windings 35 (see FIG. 4) and/or other suitable exposed portions of the stator 16/electric machine 12. For optimal distribution of the exiting coolant 21, the drain holes 90 should be positioned as close as possible to the inner diameter surface 240 of the rotor 40 due to expected effects of centrifugal forces acting on the coolant 21. The coolant 21 may thereafter return under the gravitational force to the sump 22 shown in FIG. 1.

FIG. 6 depicts an alternative approach for providing forced convection-based cooling of the rotor 40 according to the embodiment of FIGS. 3 and 4. In this embodiment, the pockets 72 are moved radially inward toward the rotor shaft 50 relative to the position of the pockets 72 in FIG. 5, such that the pockets 72 are adjacent to the rotor cavities 44. The coolant flow (arrow F) is directed along the axis of rotation AA into the coolant passages 48A, into the rotor cavities 44, and axially outward in both axial directions through the rotor 40, i.e., toward the first and second end rings 70A and 70B. The coolant 21 exits the rotor 40 through the above-noted drain holes 90 located, ideally, as close to the inner diameter surface 240 of the rotor 40 as possible given under application-specific packaging constraints.

The embodiments of FIGS. 5 and 6 therefore provide alternative approaches toward cooling the rotor magnets 55 using forced convection. The addition of convective area to the rotor 40 thus results in a lower temperature of the rotor 40 and its embedded rotor magnets 55. In the exemplary embodiment of FIG. 5, for instance, the rotor magnets 55 are cooled by the flow of coolant 21 axially along the main coolant passage 46, radially into the end ring 70B and pocket 72, and then axially around the rotor magnets 55 via the interconnected magnet cavities 42. Heat is thereby transferred directly from the rotor magnets 55 to the circulating coolant 21 before the heated coolant 21 is ultimately discharged through the drain holes 90.

Likewise, the embodiment of FIG. 6 admits the coolant 21 directly into low flux density regions LL within the rotor 40 via rotor cavities 44, with such regions LL depicted in FIG. 2. Heat from the rotor magnets 55 and laminations of the rotor 50 is thus transferred to the coolant 21, with the heated coolant 21 thereafter expelled from the rotor 40 as is the case with the embodiment of FIG. 5. Thus, the various embodiments of FIGS. 2-6 may be used as improvements to the general state of the art of rotor cooling in a rotary electric machine, e.g., the electric machine 12 described herein.

A method for cooling the electric machine 12 using the coolant 21 of FIG. 1 may be readily envisioned in view of the foregoing disclosure. Such a method may include, for instance, circulating the coolant 21 via the pump 20 through the main coolant passage 46 shown in FIGS. 5 and 6. Such a method may also include directing the coolant 21 from the main coolant passage 46, through the radial shaft coolant passages 48 or 48A of the rotor shaft 50, and into a respective one of the rotor cavities 42 or 44 directly or through the first or second end rings 70A or 70B. Additionally, the method may include discharging the coolant 21 from the rotor 40 through a set of drain holes 90 defined by the first and/or second end rings 70A and/or 70B.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A rotary electric machine for use with coolant, the rotary electric machine comprising:
    a stator; and
    a rotor assembly spaced apart from the stator by an airgap and including:
        a rotor having an axis of rotation, an inner diameter surface, and an outer diameter surface, wherein the rotor defines a plurality of cavities;
        wherein the rotor includes low flux density regions, medium flux density regions, and high flux density regions, and wherein the high flux density regions have a flux density higher than the low flux density regions and the medium flux density regions, and wherein the medium flux density regions have a flux density higher than the low flux density regions;
        wherein the cavities of the rotor are spaced away from the high flux density regions;
        rotor magnets embedded within the rotor proximate the outer diameter surface;
        a rotor shaft connected to the rotor, the rotor shaft defining a main coolant passage along the axis of rotation configured to receive the coolant, and multiple radial shaft coolant passages each in fluid communication with the main coolant passage and the cavities; and
        first and second end rings respectively positioned at opposing distal ends of the rotor, each of the first and second end rings defining therein an annular pocket in fluid communication with the main coolant passage;
    wherein the rotor shaft, the rotor, and the first and second end rings are collectively configured, via the main coolant passage, the radial shaft coolant passages, the cavities, and the annular pocket of each of the first and second end rings, to conduct the coolant through the rotor to thereby cool the rotor magnets via forced convection.

2. The rotary electric machine of claim 1, wherein the cavities are magnet cavities located proximate the outer diameter surface, and wherein each respective one of the rotor magnets is disposed within a respective one of the magnet cavities.

3. The rotary electric machine of claim 1, wherein the rotor magnets are arranged in a generally V-shaped configuration when the rotor is viewed along the axis of rotation.

4. The rotary electric machine of claim 1, wherein the radial shaft coolant passages are located at an axial midpoint of the rotor.

5. The rotary electric machine of claim 1, wherein the stator circumscribes the rotor, the airgap is a radial airgap, and the rotary electric machine is configured as a radial flux-type traction motor.

6. The rotary electric machine of claim 1, wherein the cavities extend from the inner diameter surface of the rotor toward the rotor magnets within a predetermined number of the low flux density regions.

7. The rotary electric machine of claim 6, wherein each of the cavities includes a main branch and at least one secondary branch intersecting the main branch.

8. The rotary electric machine of claim 6, wherein the cavities of the rotor extend partially into a predetermined number of the medium flux density regions.

9. The rotary electric machine of claim 1, wherein the first and/or second end rings define a set of drain holes in fluid communication with the cavities.

10. The rotary electric machine of claim 9, wherein the drain holes are evenly spaced with respect to each other and positioned adjacent to the inner diameter surface of the rotor.

11. The rotary electric machine of claim 10, wherein the drain holes are configured to deposit the coolant onto the stator when the coolant exits the rotor through the drain holes.

12. An electric propulsion system comprising:
    a direct current ("DC") voltage bus;
    a traction power inverter module ("TPIM") connected to and configured to receive a DC input voltage from the DC voltage bus, and to output an alternating current ("AC") voltage;
    a polyphase rotary electric machine for use with a coolant and energized via the AC voltage from the TPIM, comprising:
        a stator; and
        a rotor assembly spaced apart from the stator by an airgap, the rotor assembly including:
            a rotor having an axis of rotation, an inner diameter surface, and an outer diameter surface, the rotor defining a plurality of cavities;
            wherein the rotor includes low flux density regions, medium flux density regions, and high flux density regions, and wherein the high flux density regions have a flux density higher than the low flux density regions and the medium flux density regions, and wherein the medium flux density regions have a flux density higher than the low flux density regions;
            wherein the cavities of the rotor are spaced away from the high flux density regions;

rotor magnets embedded in the rotor proximate the outer diameter surface;

a rotor shaft connected to the rotor, wherein the rotor shaft defines a main coolant passage along the axis of rotation that is configured to receive the coolant, and also defines radial shaft coolant passages in fluid communication with the main coolant passage and a respective one of the cavities; and first and second end rings respectively positioned at opposing distal ends of the rotor, each of the first and second end rings defining an annular pocket in fluid communication with the cavities; and a load coupled to and driven by the rotor shaft, wherein the rotor shaft, the rotor, and the first and second end rings are collectively configured to conduct the coolant through the rotor to thereby cool the rotor and/or the rotor magnets via forced convection.

13. The electric propulsion system of claim 12, wherein the cavities are magnet cavities, and each of the rotor magnets is disposed within a respective one of the magnet cavities.

14. The electric propulsion system of claim 12, wherein the cavities extend from the inner diameter surface of the rotor toward the rotor magnets within a predetermined number of the low flux density regions.

15. The electric propulsion system of claim 12, wherein the first and/or second end rings define drain holes in fluid communication with the cavities.

16. The electric propulsion system of claim 15, wherein the drain holes are evenly spaced with respect to each other and positioned adjacent to the inner diameter surface of the rotor, and the drain holes are configured to deposit the coolant onto the stator when the coolant exits the rotor.

17. A method for cooling a rotary electric machine using coolant, the rotary electric machine having a rotor positioned between first and second end rings, wherein the rotor defines a plurality of cavities, the method comprising:

circulating the coolant via a pump through a main coolant passage defined by a rotor shaft of the rotary electric machine, wherein the main coolant passage extends along an axis of rotation of the rotor shaft, and wherein the rotor shaft is connected to the rotor;

directing the coolant from the main coolant passage, through radial shaft coolant passages defined by the rotor shaft, and into a respective one of the cavities directly or through the first or second end rings, wherein the rotor includes low flux density regions, medium flux density regions, and high flux density regions, and wherein the high flux density regions have a flux density higher than the low flux density regions and the medium flux density regions, and wherein the medium flux density regions have a flux density higher than the low flux density regions, and wherein the cavities of the rotor are spaced away from the high flux density regions; and discharging the coolant from the rotor through drain holes defined by the first and/or second end rings.

18. The method of claim 17, wherein the cavities extend from an inner diameter surface of the rotor toward rotor magnets within a predetermined number of the low flux density regions.

19. The method of claim 17, wherein the cavities are magnet cavities and each respective one of rotor magnets is disposed within a respective one of the magnet cavities, and wherein directing the coolant from the main coolant passage, through the radial shaft coolant passages of the rotor shaft, and into the respective one of the cavities includes placing the coolant in direct wetted contact with the rotor magnets.

20. The method of claim 17, wherein the drain holes are in fluid communication with the cavities of the rotor, the drain holes are evenly spaced with respect to each other and positioned adjacent to an inner diameter surface of the rotor, and discharging the coolant from the rotor includes depositing the coolant onto a stator of the rotary electric machine when the coolant exits the rotor.

* * * * *